(12) United States Patent
Hong et al.

(10) Patent No.: US 8,885,938 B2
(45) Date of Patent: Nov. 11, 2014

(54) DETECTING CONCEALED THREATS

(75) Inventors: Baoming Hong, Concord, MA (US);
Julia Pavlovich, Brighton, MA (US);
David Schafer, Rowley, MA (US);
Zhengrong Ying, Belmont, MA (US)

(73) Assignee: Analogic Corporation, Peabody, MA (US)

( * ) Notice: Subject to any disclaimer, the term of this patent is extended or adjusted under 35 U.S.C. 154(b) by 126 days.

(21) Appl. No.: 13/126,622

(22) PCT Filed: Oct. 30, 2008

(86) PCT No.: PCT/US2008/081768
§ 371 (c)(1),
(2), (4) Date: Apr. 28, 2011

(87) PCT Pub. No.: WO2010/050952
PCT Pub. Date: May 6, 2010

(65) Prior Publication Data
US 2011/0206240 A1   Aug. 25, 2011

(51) Int. Cl.
*G06K 9/34*    (2006.01)
*G06K 9/00*    (2006.01)
*G01N 23/04*   (2006.01)
*G06K 9/62*    (2006.01)

(52) U.S. Cl.
CPC .......... *G06K 9/00771* (2013.01); *G06K 9/6247* (2013.01); *G06K 2209/09* (2013.01)
USPC .............................. 382/173; 382/181; 378/57

(58) Field of Classification Search
None
See application file for complete search history.

(56) References Cited

U.S. PATENT DOCUMENTS

| 6,026,143 | A | | 2/2000 | Simanovsky et al. |
| 6,108,396 | A | * | 8/2000 | Bechwati et al. ................. 378/4 |
| 6,195,444 | B1 | | 2/2001 | Simanovsky et al. |
| 6,345,113 | B1 | * | 2/2002 | Crawford et al. ............ 382/131 |
| 2005/0036689 | A1 | | 2/2005 | Mahdavieh |
| 2006/0002585 | A1 | | 1/2006 | Larson et al. |

OTHER PUBLICATIONS

First Chinese Office Action cited in Chinese Application No. 200880131839.1 dated Oct. 26, 2012, 13 pgs.
International Search Report cited in related application No. PCT/US2008/081768 dated Jun. 17, 2009.
Chinese Notice of Allowance cited in Chinese Application No. 2008801318391 dated Dec. 6, 2013, 1 pg.

* cited by examiner

*Primary Examiner* — Jason M Repko
*Assistant Examiner* — Ryan P Potts
(74) *Attorney, Agent, or Firm* — Cooper Legal Group LLC

(57) ABSTRACT

Potential threat items may be concealed inside objects, such as portable electronic devices, that are subject to imaging for example, at a security checkpoint. Data from an imaged object can be compared to pre-determined object data to determine a class for the imaged object. Further, an object can be identified inside a container (e.g., a laptop inside luggage). One-dimensional Eigen projections can be used to partition the imaged object into partitions, and feature vectors from the partitions and the object image data can be used to generate layout feature vectors. One or more layout feature vectors can be compared to training data for threat versus non-threat-containing items from the imaged object's class to determine if the imaged object contains a potential threat item.

20 Claims, 10 Drawing Sheets

DETECTING CONCEALED THREATS

BACKGROUND

Security at airports and in other travel related areas is an important issue given today's sociopolitical climate, as well as other considerations. One technique used to promote travel safety is through baggage inspection. In some instances, luggage is visually inspected and/or manually inspected by screeners. In other instances, luggage and other items are initially subjected to imaging using some type of imaging apparatus, and then inspected further with other means, such as hand search, if necessary. For example, an x-ray line scanner may be used to provide screeners with one or multiple substantially two dimensional views of the contents of a bag, or a computed tomography (CT) scanner may be used to provide views of two or three dimensional reconstructed images of scanned bags.

Presently, large amounts of data manipulation can be performed on two-dimensional and/or three-dimensional image sets of objects, such as luggage subjected to imaging by an imaging apparatus. Typically, x-ray line scanners are utilized in many airport check points. Data manipulation can allow for a certain amount of automated (pre-human) screening to be performed (e.g., to detect objects that may comprise threat items, such as explosives, for example). However, current technology limitations may not allow for effective automated screening of some items inside a piece of luggage. For example, current x-ray line scanners may merely provide one or two views of a scanned object. This limited imaging capability can prevent a screener from seeing clearly contents of a scanned bag, for example.

Accordingly, in some cases such as with laptop computers and video cameras, in order for automated screening to determine whether a particular item comprises a potential threat object, the item may have to be removed from the luggage and subjected to individual scanning. The process of removing an item (e.g., a laptop computer) from a piece of luggage and thus scanning and examining two separate items increases an amount of time needed to pass through a security check-point at an airport. This is an undesirable situation, at least, because there is a desire to increase throughput at airports.

Further, certain objects such as electronic devices (e.g., laptop computers) are often found in carry-on luggage. As described above, these objects are often removed from luggage and placed either into bins or directly on conveyor belts prior to being scanned by an imaging device. Detecting threats such as explosives (e.g., sheet shaped explosives) concealed inside electronic devices can be challenging. Images generated by an imaging device (e.g., CT scanner) can be corrupted by artifacts, which are usually generated by high density components inside electronic devices (e.g., an optical drive, battery inside a laptop, or other high atomic number Z components).

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

According one aspect, a system is provided for identifying a potentially threat-containing object, from a class of objects, which has been subjected to imaging using an imaging apparatus. In this aspect the system can comprise an object class identifier configured to compare data from a segmented object in an image with pre-determined object class data to identify to which class of objects the segmented object may belong. Further, the system can comprise an object partitioner configured to partition the segmented object into partitions, based on the object's class, using Eigen analysis. Additionally, the system can comprise a layout vector generator configured to generate layout feature vectors for an identified object. Also, the system can comprise a threat determiner configured to determine a presence of a threat in an identified object by comparing a layout feature vectors from the identified object to one or more pre-determined boundaries, which correspond to the segmented object's class.

According to another aspect, a method is provided for identifying a potentially threat-containing object, from a class of objects, which has been subjected to imaging using an imaging apparatus. In this aspect, respective object data can be compared to pre-determined object data, from one or more respective classes of objects, to determine whether a segmented object in the image belongs to a class of known objects. Further, one-dimensional Eigen projections can be used to partition identified segmented object into partitions. Additionally, feature vectors, such as property values from one or more segmented objects/partitions can be combined to generate layout feature vectors. Also, layout feature vectors can be compared to one or more pre-determined boundaries for identified potential threats to determine if a potential threat is present in an identified object.

According to another aspect, a system is provided for identifying potentially threat-containing objects, from a class of objects, inside a container that has been subjected to scanning using a computed tomography (CT) scanner. In this aspect, the system can comprise a CT scanner configured to scan objects and generate image data for the scanned objects, and an object segmentor configured to identify an object, which belongs to a particular class of objects, inside the container, from an imaging image of the container, which comprises an image element selector configured to select one or more image elements, a dilated element generator configured to generate one or more dilated elements, and an aggregated object splitter configured to determine if an identified object comprises an aggregation of more than one object, and split the aggregated object into two or more objects. Further, in this aspect, the system can comprise an object region extractor configured to partition the identified object into object regions using Eigen analysis, a sub-region extractor configured to identify sub-regions in the identified object regions, a vector layout generator configured to generate one or more layout feature vectors from the identified object, a discriminating boundary generator configured to generate a discriminating boundary for a class of objects to which an identified object belongs, and a threat determiner configured to compare the one or more layout feature vectors to one or more pre-determined thresholds corresponding to the identified object's class to determine whether the identified object is a potentially threat-containing object.

According to another aspect, a method is provided scanning objects inside a container for potential threats without having to take the objects out of the container. In this aspect, a container is subjected to imaging using an imaging apparatus, an object is identified inside the container by comparing object data from the image with pre-determined object data for classes of objects, regions are identified within an identified object in an image by comparing regional data from the object in the image with pre-determined regional data for respective classes of objects, and either or both an object and regional data are compared with pre-determined potential threat data to determine if the object is a potential threat.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
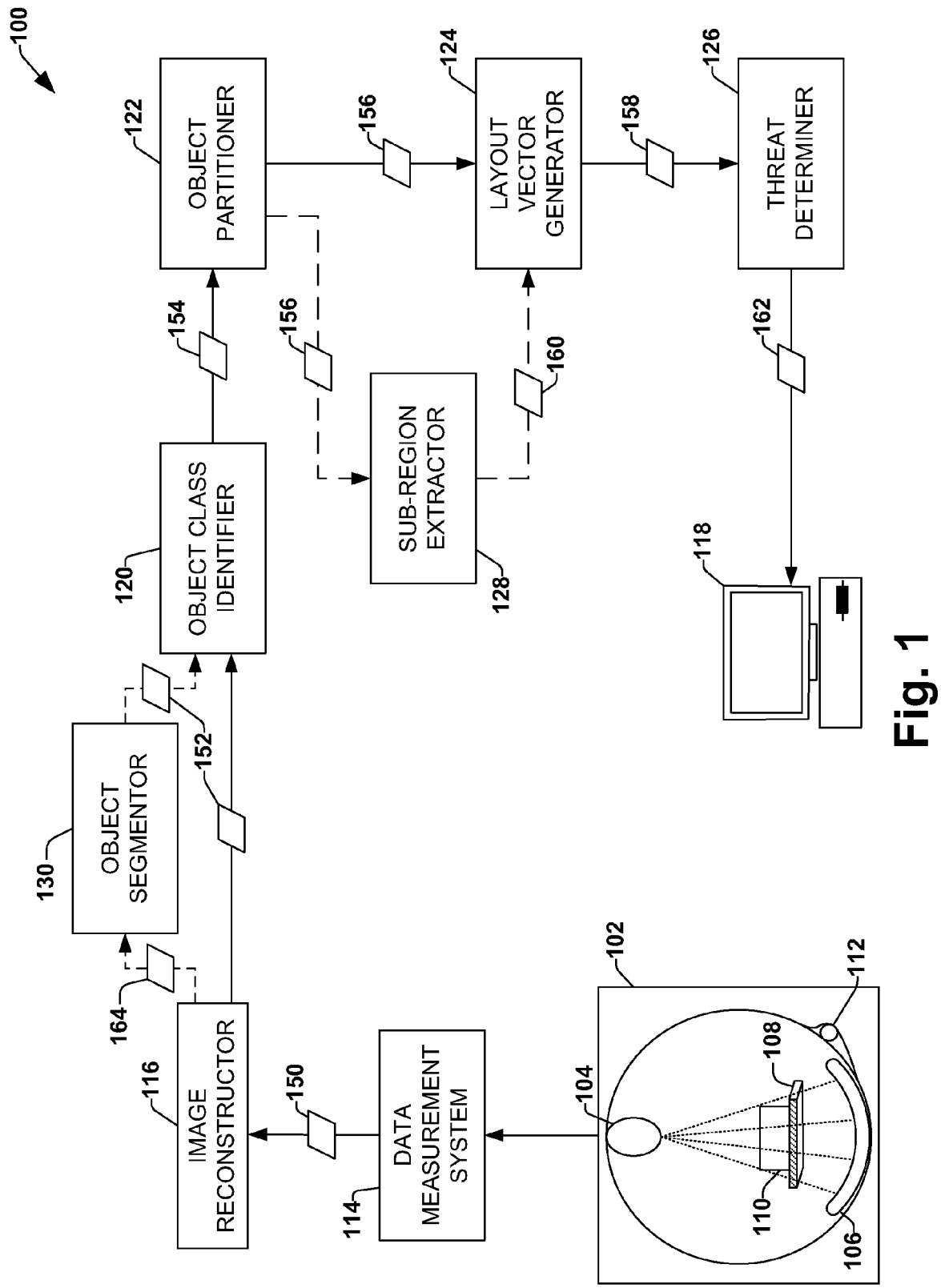
FIG. 1 is a schematic block diagram illustrating an environment wherein potential threat object identification may be implemented, as provided herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Systems and techniques that can facilitate identification of potential threat objects concealed by electronic devices using images generated by an imaging device (e.g. a computed tomography (CT) scanner) where the electronic devices are placed at security stations at airports are provided herein. That is, in one embodiment, techniques and systems for identifying potential threat objects concealed inside electronic devices, which are placed inside containers, without having to remove the electronic devices from the container subject to screening, are provided herein. Further, in another embodiment, techniques and systems for identifying potential threat objects concealed inside a concealing object (e.g. a laptop computer or other electronic devices) without segmenting a potential threat object (e.g., an explosive) from the concealing object (e.g. a laptop computer or other electronic devices) are also provided.

FIG. 1 is an illustration of an example environment 100 (e.g. a security station in an airport) in which a system may be employed for identifying a potentially threat-containing object, from a class of objects, which may be placed inside a container (e.g., luggage or screening bins), or may be directly imaged by using an imaging apparatus (e.g., a CT scanner). In the example environment 100 the imaging apparatus comprises an object scanning apparatus 102, such as a security scanning apparatus (e.g., used to scan luggage at an airport). The scanning apparatus 102 may be used to scan one or more objects 110 (e.g., a series of suitcases at the airport). The scanning apparatus typically comprises a radiation source 104 (e.g., an X-ray tube), an array of radiation detectors 106 (e.g., X-ray detectors), a rotator 112 (e.g., a gantry motor) for rotating the radiation source 104 and detectors 106, which can both be mounted on a rotating disk (not shown), around the object(s) being scanned 110, and a conveyor 108 configured to convey the object(s) 110 from an upstream portion (not shown) of the object scanning apparatus 102 to a downstream portion (not shown) of 102. It will be appreciated that, while the example environment utilizes an x-ray scanning apparatus, the systems and techniques, described herein, are not limited to x-ray scanning devices. For example, the system may utilize an infrared imaging device to generate images based on infrared imaging of one or more objects.

As an example, a computer tomography (CT) security scanner 102 that includes an X-ray source 104, such as an X-ray tube, can generate a fan, cone, wedge, or other shaped beam of X-ray radiation that traverses one or more objects 110, such as suitcases, in an examination region. In this example, the X-rays are emitted by the source 104, traverse the examination region that contains the object(s) 110 to be scanned, and are detected by an X-ray detector array 106 across from the X-ray source 104. Further, a rotator 112, such as a gantry motor drive attached to the scanner, can be used to rotate the X-ray source 104 and detector 106 around the object(s) 110, for example. In this way, X-ray projections from a variety of perspectives of the suitcase can be collected, for example, creating a set of X-ray projections for the object (s). While illustrated as a third generation system, those of ordinary skill in the art will understand that fifth generation and other implementations are also contemplated. As yet another example, the radiation source 104 and detector array 106 may remain stationary while the object is rotated.

In the example environment 100, a data measurement system 114 is operably coupled to the scanning apparatus 102 (e.g., mounted on a rotating disk (not shown)), and is typically configured to collect information and data from the detector 106, and may be used to compile the collected data into projection space data 150 for an object 110. As an example, X-ray projections may be acquired at each of plurality of angular positions with respect to the object 110. Further, as the conveyor 108 convey the object(s) 110 from an upstream portion (not shown) of the object scanning apparatus 102 to a downstream portion (not shown), the plurality of angular X-ray projections may be acquired at a plurality of points along an axis of the conveyor with respect to the object(s) 110 (e.g. a helical trajectory with respect to the scanned object). In one embodiment, the plurality of angular projections may comprise an X axis and a Y axis defined within a plane of the rotating disk, and a Z axis can also be defined as the direction along which the conveyor moves.

In the example environment 100, an image reconstructor 116 is coupled to the data measurement system 114, and is configured to receive the data 150 from the data measurement system 114 and to generate image data 152 indicative of the scanned object 110 using a suitable analytical, iterative, and/or other reconstruction technique (e.g., backprojecting from projection space to image space).

In one embodiment, the image data 152 for a suitcase, for example, may ultimately be displayed on a monitor 118 (e.g., desktop or laptop computer) for human observation. In this embodiment, an operator may isolate and manipulate the image, for example, rotating and viewing the suitcase from a variety of angles, zoom levels, and positions.

It will be appreciated that, while the example environment 100 utilizes the image reconstructor 116 to reconstruct image data from the data 150 generated by the data measurement system 114, for example, for a suitcase being scanned, the techniques and systems, described herein, are not limited to this embodiment. In another embodiment, for example, image data may be generated by an imaging apparatus that is not coupled to the system for identifying a potentially threat-containing object. In this example, the image data may be stored onto an electronic storage device (e.g., a CD ROM, hard-drive, flash memory) and delivered to the system for identifying a potentially threat-containing object electronically.

In the example environment 100, in one embodiment, an object segmentor 130 may receive the image data 164, for example, for the scanned object(s) 110 (e.g., a carry-on luggage containing a laptop computer), to perform object segmentation on the image of the object(s) 110. In this example, the object segmentor 130 may be configured to segment objects inside a container in an imaging image of the container. In one embodiment, the object segmentor 130 can generate image data for one or more segmented objects 152.

As an example, an x-ray scanner or a CT scanner may be used at a security checkpoint at an airport to scan passenger luggage. Luggage going through the scanner may contain portable electronic devices, such as laptop computers, handheld video games, portable DVD players, video cameras, etc., for example. In this example, the object segmentor 130 may segment the portable electronic device in an image of the luggage (e.g., separate the device from other objects inside the luggage, in the image) generated by the x-ray scanner or the CT scanner. As another example, a portable electronic device may be taken out of a passenger's luggage and placed into a bin for scanning by an x-ray scanner (e.g., current FAA regulations require that laptop computers be removed from a passenger's luggage prior to screening) or a CT scanner. In this example, the object segmentor 130 may be able to segment the portable electronic device inside an image of the bin generated by the x-ray scanner or a CT scanner. It will be appreciated that, in this example environment, an object can also be imaged (e.g., scanned by an x-ray scanner or a CT scanner) directly, and may not be located inside a container (e.g., luggage or a bin).

In the example environment 100, image data for objects 152 can be sent to an object class identifier 120, which can be configured to compare data of a segmented object 152 with pre-determined object class data (e.g., data for a number of classes of portable electronic devices, such as laptops, handheld video games, portable DVD players, etc.) to identify whether the segmented object belongs to a particular class of objects. In one embodiment, pre-determined object class data can be collected for a variety of portable electronic devices belonging to various classes, for example, laptop computers, portable DVD players, media players, handheld video games, and others. In this embodiment, the data for devices belonging to respective classes can be collected and stored by subjecting the devices to imaging (e.g., scanned by a CT scanner) using a same imaging apparatus as is used in the example environment 100. In this way, for example, data generated by the screening process can be compared with the pre-determined data to identify which of the classes the segmented object belongs.

In the example environment 100, object image data and class information 154 can be sent to an object partitioner 122, which can be configured to partition an object (e.g., a laptop computer) into object partitions (e.g., layers of the laptop computer) using Eigen analysis. As an example, a laptop computer can often be divided into three layers along a height direction. In this example, a screen and keyboard may be part of an upper layer, a hard drive, memory and an optical drive may be in a middle layer, and a battery and motherboard may be in a bottom layer. Typically, respective layers can have particular density distributions, and if a sheet or bulk explosive, for example, were introduced into a layer the density distribution of the layer may be different than expected. In this way, for example, information identifying a potential threat item concealed in an image representation of a segmented object may be determined by using object partition information.

In the example environment 100, in one embodiment, object partition data 156 comprising data that identified partitions in an object from an imaging image, can be sent to a sub-region extractor 128. In this embodiment, the sub-region extractor 128 can be configured to identify sub-regions (160) in the identified object partitions (156). While an object may be partitioned into layers, for example, respective layers may be further partitioned into sub-regions. As an example, a middle layer of a laptop computer may comprise an optical drive, a hard drive, memory, and a modem or networking device. In one embodiment, sub-regions of a partition of an object may be identified, for example, in order to compare them with known data. In this embodiment, sub-region data 160 for respective partitions of the object can be generated.

In the example environment 100, object partition data 156 (and/or in one embodiment, sub-region data 160) can be sent to a layout feature vector generator 124, which can be configured to generate one or more layout feature vectors for the object. As an example, a layout feature vector may comprise means, standard deviations, and other higher derivatives of density values in ranges of interested density for threat detection within a particular layer or partition of the object. For example, one range of interested density can be from 0.5 g/cc to 2.5 g/cc. As another example, a layout feature vector may also comprise masses computed from density values in ranges of interested density for threat detection for respective layers or partitions of the object. Masses, means, standard deviations and other derivatives of the density values can also be combined and aggregated from different ranges of interested density for threat detection and become feature values of the layout feature vector. The derivatives of the density values can include, for example, local gradient distributions, mean gradients, kurtosis, skews, etc.

In the example environment 100, a threat determiner 126 can receive one or more layout feature vectors 158 for an object. The threat determiner 126 can be configured to compare the one or more layout feature vectors to one or more pre-determined boundaries, corresponding to the object's class, to determine whether the object contains a potential threat (e.g. explosives).

In one embodiment, a boundary can be obtained from a training process. In the training process, objects that contain threat objects and objects that do not contain threat objects can be scanned by a same imaging device as used in screening (as described above). In this embodiment, the boundaries are obtained to delineate objects that contain threat objects from objects that do not contain threat objects. It will be appreciated that various algorithms, such as support vector machine, neural network, Eigen principal component analysis, independent component analysis, and others, can be used for separating two classes of objects (one that contains no threat and the other contains threat). Those skilled in the art may devise alternative techniques for separating two classes of objects, and the methods and systems described herein are not limited to any particular technique for separating two classes of objects.

As an example, prior to screening luggage at a security checkpoint, a series of laptop computers can be subjected to CT scanning using a same-type CT scanner as will be used at the security checkpoint. In this example, the laptops can be scanned without a potential threat item (e.g., explosives), and with the potential threat items. In this way, in this example, a boundary can be determined for layout feature vectors that can separate those items with threat object from without threat items. Therefore, when a laptop is screened at the security station, a layout feature vector from the screening can be compared to the boundary, for example. In this way, in this example, if a layout feature vector for the laptop under screening is on a side of the boundary corresponding to threat-containing items, the laptop can be flagged as a potentially threat-containing object.

Information concerning whether a scanned object is potentially threat-containing 162 can be sent to a terminal 118 in the example environment 100, for example, comprising a display that can be viewed by security personal at a luggage screening checkpoint. In this way, in this example, real-time threat potential information can be retrieved for objects subjected to scanning by a security scanner 102.

In one aspect, a potentially threat-containing object may be located inside a container (e.g., a piece of luggage or a security screening bin). For example, passengers entering airport terminals are typically asked to place carry-on luggage through a screening apparatus, which can image (e.g., generate an x-ray image of) the luggage to facilitate determination of its contents (e.g., contains potential threat items, such as explosives, guns, knives, etc.). In this example, passengers often carry laptop computers while traveling, and a laptop computer may be used to conceal a threat item (e.g., sheet explosives between layers, or bulk explosives in component compartments). While passengers are typically required to take laptops out of luggage and place them into bins, it may be advantageous (e.g., expedient) to be able to identify laptops (and other portable electronic devices) inside luggage, for example, and then further to determine whether laptop computers contain potential threat items.

Figure 2:
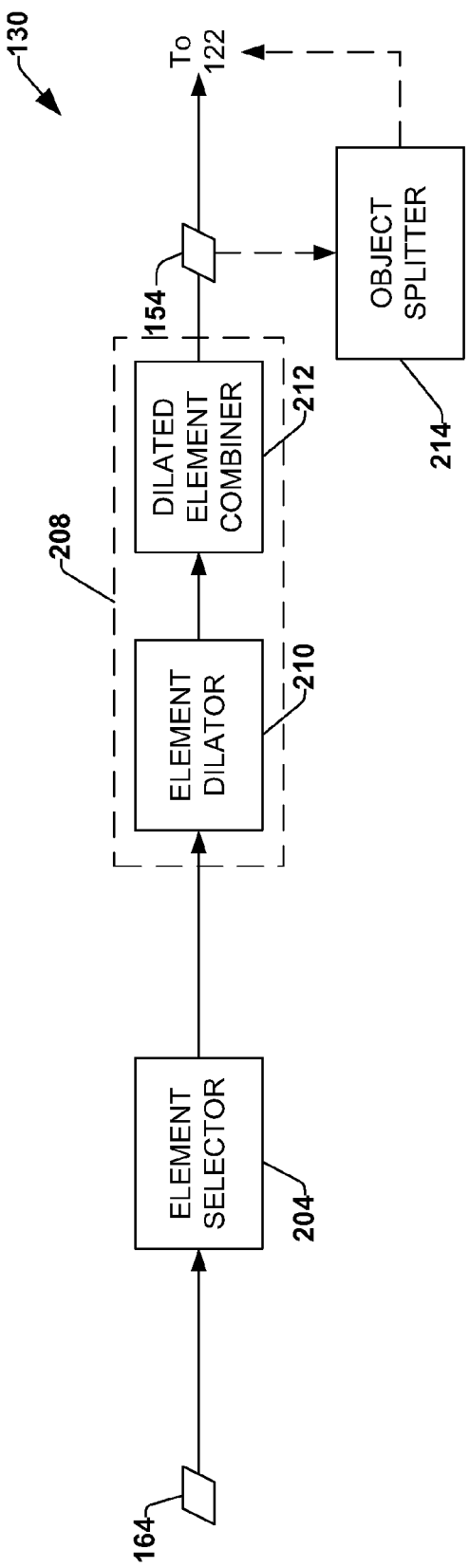
FIG. 2 is a component block diagram illustrating one or more components of an environment wherein potential threat object identification, inside an imaged container, may be implemented as provided herein.

FIG. 2 is a component block diagram illustrating one embodiment of an object segmentor 130, which can be configured to segment objects inside a container (e.g. luggage) using image data generated by imaging the container using an imaging apparatus (e.g., an x-ray scanner or CT scanner). The image data is sent to an image element selector 204. The image element selector 204 can be configured to select elements (e.g., voxels in a three-dimensional image or pixels in a two-dimensional image) in the image of the scanned container 164 with a property (e.g. density or atomic number (Z) measurements, density gradients, Z gradients) corresponding to a first pre-determined property range. In this way, for example, elements of an image can be selected based on one or more pre-determined properties. It will be appreciated that properties of an image element may comprise derivative properties (e.g., density gradients, Z gradients) and/or other properties (e.g., density or atomic number (Z) measurements), and the system described herein is not limited to particular properties merely that one or more image element properties may be used to select elements in an image.

In one embodiment, the image element selector 204 can be configured to select voxels (e.g., volume elements in a three dimensional image) in a three-dimensional image of the object that have a density within one or more specified ranges (e.g., a range that comprises portable electronic devices), such as density gradients (derived property from density) or Z gradients (derived property from measured Z) within one or more specified ranges. In another embodiment, the image element selector 204 can be configured to select pixels (e.g., area elements in a two dimensional image) in a two-dimensional image of the object that have an image intensity within one or more specified ranges (e.g., a range that comprises portable electronic devices).

It will be appreciated that, while voxels and pixels are used in example embodiments, the techniques and systems described herein are not limited to these embodiments. Voxels are merely volume elements and pixels are merely area elements for images. Those skilled in the art may devise other embodiments that comprise different volume and area elements for selection, which are anticipated by the techniques and systems described herein.

In FIG. 2, the example embodiment of the object segmentor 130 further comprises a dilated element combination generator 208. In this embodiment, an image element dilator 210, located in the dilated element combination generator 208, receives image data of the selected image elements, and can be configured to identify image elements neighboring the respective selected image elements in the image having a property (e.g., one or more properties or associated derivatives of the properties) corresponding to a second pre-determined property range (e.g., of the one or more properties or associated derivatives of the properties). As an example, the image element dilator 210 can evaluate elements (e.g., voxels or pixels) that neighbor (e.g., are spatially connected to) the selected image elements, and determine whether a property (e.g., one or more properties such as density and Z) of the neighbors is within another pre-determined range.

In one embodiment, the image element dilator 210 can evaluate voxels that are neighboring (e.g., spatially connected) respective selected voxels generated by the image element selector 204. In this embodiment, neighboring voxels having a density that is within a predetermined range for a portable electronic device, for example, can be identified by the image element dilator 210. In another embodiment, the image element dilator 210 can be utilized to identify neighboring pixels in a two-dimensional image that have an image intensity that is within a predetermined range for a portable electronic device, for example. It will be appreciated that "neighboring" can include spatially connected, for three-dimensional images, connected, for two-dimensional images, but can also include combinations where the neighboring elements are not connected, as may be devised by those skilled in the art.

In the example embodiment of the object segmentor 130, the dilated element combination generator 208 further comprises a dilated image element combiner 212, which can be configured to combine the selected image elements generated by 204 and identified neighboring image elements generated from 210 to generate one or more segmented objects 154. As an example, the dilated image element combiner 212 can combine the selected image elements with corresponding neighboring elements identified by the element dilator 210, to generate segmented objects image data 154 for the container 110 imaged by an imaging apparatus 102.

In another example, the dilated image element combiner 212 may apply a connected components labeling (CCL) algorithm to selected image elements and identified neighboring image elements to create segmented objects. In this example, the segmented objects can be created by grouping the image elements which are physically close together and which have properties (e.g., including derived properties) within a pre-determined range of the properties (e.g., and respective derived properties).

In one embodiment, neighboring voxels identified by the element dilator 210 can be combined with the voxels generated by the image element selector 204, to generate image data 154 for segmented portable electronic devices that were in a container (e.g., piece of luggage) scanned by a CT scanner, for example, at an airport security checkpoint. In another embodiment, neighboring pixels in a two-dimensional image can be combined with pixels generated by the image element selector 204.

In one embodiment of this aspect, for example, where more than one object may have been combined in and generated from the image data, the object segmentor 130 can comprise an object splitter 214. In this embodiment, the object splitter 214 can be configured to determine if a segmented object comprises an aggregation of more than one physical object, and split the aggregated object into two or more objects. For example, if two objects, having a similar density, were disposed in a piece of luggage such that they were touching each other, the dilated element combination generator 208 may aggregate the two items as one. In this example, the object splitter 214 can identify that there are two objects aggregated, and split them into two separate objects in the image data. Further, in this example, algorithms such as mean shift segmentation and density and spatial histogram based analysis can be used to split such an aggregation.

Figure 3:
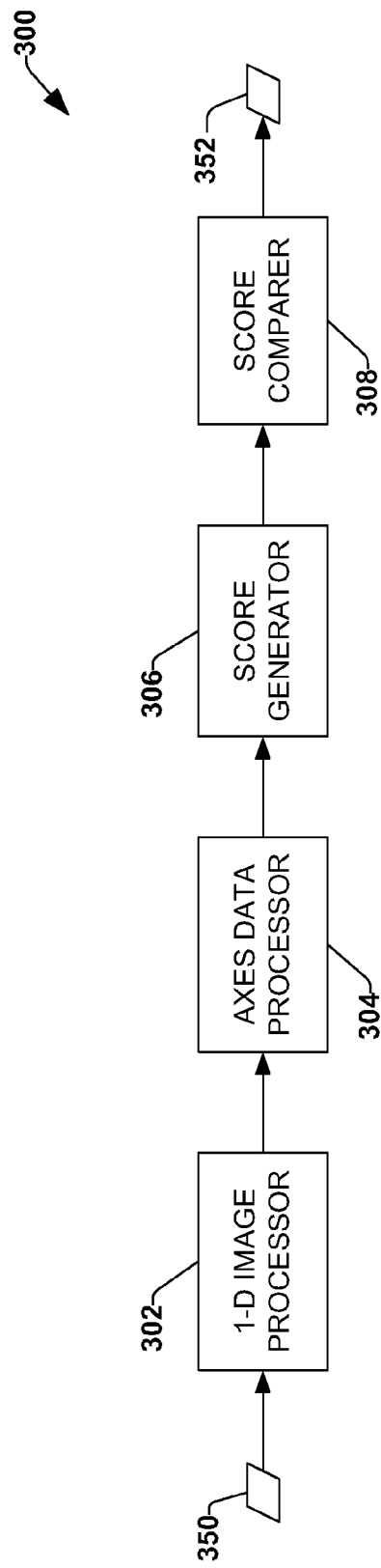
FIG. 3 is component block diagram illustrating one embodiment of one or more components of an environment wherein potential threat object identification may be implemented as provided herein.

In another embodiment of this aspect, for example, if a portable electronic device, such as a laptop computer, is placed into a security bin to be scanned by an x-ray scanning apparatus, an object segmentor may be able to quickly segment the device in a resulting image without using image element selector 204 or image dilated element combination generator 208. FIG. 3 is a component block diagram illustrating one embodiment 300 of an object segmentor (e.g., such as FIG. 1, 130), configured to segment objects in a container, such as a security bin.

In this embodiment 300, a one-dimensional image data processor 302 can be configured to generate one-dimensional representations of one or more axes of an imaging image 350 (e.g., comprising a container containing one or more objects). In one embodiment, axes of an image may comprise an X axis corresponding to a horizontal axis in the image (e.g., along a width of the image across a conveyor belt carrying a scanned bin), a Y axis corresponding to a vertical axis in the image (e.g., along a height of the image up from the conveyor belt), and a Z axis corresponding to a belt direction (e.g., a direction that the conveyor belt travels when scanning items). In this embodiment, one-dimensional projections (e.g., lines plotted on a graph) can be generated for respective axes using, for example, actual reconstructed image data by summing respective image elements on a plane defined by the remaining axes. As an example, X axis projection data can be generated by summing respective image elements on respective Y-Z planes with respect to a respective x coordinate on the X axis.

In the embodiment 300, of FIG. 3, an axes data processor 304 can be configured to compare data points in a one dimensional representation of an axis with a pre-determined threshold. In one embodiment, data points along the one-dimensional representation of an image's axis can correspond to slices of the image along that axis, for example, from reconstructed image data. The axes data processor 304 can compare respective data points with a pre-determined threshold value (e.g., determined by scanning portable electronic devices using a same-type scanner as used to scan the bin containing the objects in question), and determine which data points are above the pre-determined threshold.

In the embodiment 300, of FIG. 3, a continuation score generator 306 can be configured to generate a score corresponding to a desired number of consecutive data points greater than the threshold for respective axes. In one embodiment, a continuation score can comprise a number of data points that are both consecutive and above the pre-determined threshold. In this embodiment, the continuation score generator 306 may identify one or more segments of the one-dimensional representation of an image axis that are both consecutive and above the pre-determined threshold. If merely one segment is identified, the continuation score generator 306 can use that segment's score, however, if more than one segment is identified that are both consecutive and above the pre-determined threshold continuation score generator 306 can use the score of the segment having a largest score. It will be appreciated that those skilled in the art may devise techniques and systems utilizing a different desired score such as using the second maximum, and median.

In the embodiment 300, a continuation score comparison component 308 can be configured to compare continuation scores with pre-determined scores for one or more classes to determine whether an object corresponds to a class of objects. In one embodiment, one may generate pre-determined continuation scores by subjecting a variety of portable electronic devices, belonging to respective classes (e.g., laptop computers, portable DVD players, handheld video games, media players, etc.), to imaging using a same-type imaging device as used for an image in question. In this embodiment, pre-determined continuation scores can be generated for respective classes, and the continuation score comparison component 308 can compare a continuation score generated by the continuation score generator 306 with pre-determined continuation scores for respective classes of object to determine whether the object in the bin, for example, belongs to one of the classes of objects.

In another embodiment, the object segmentor (e.g., such as FIG. 1, 130) can comprise an image object data generator, which can be configured to generate a bounding box for a desired object in the security bin by using respective axis projection data, for example, as generated by the axes data processor 304. In this example, the bounding box can comprise a lower bound coordinate and an upper bound coordinate for respective axes. The lower bound coordinate for a respective axis can be identified using corresponding axis projection data as a coordinate of a first data point that is greater than a first pre-determined threshold. The upper bound coordinate for a respective axis can be identified using corresponding axis projection data as a coordinate of a last data point that is greater than a second pre-determined threshold. In this embodiment, the segmented object can comprise image elements, for example, that are within ranges of pre-defined properties and derived properties of image elements within the bounding box.

In another aspect, certain objects, such as portable electronic devices (e.g., laptop computers), can often be comprised of components that are located in a similar location and are of similar make up across a variety of devices from a same class. As an example, laptop computers are typically comprised of an LCD screen; a keyboard; a variety of internal components such as an optical drive, hard drive, memory, and a modem/networking device, a motherboard; and a battery. Further, in this example, these components are typically arranged in a similar manner for laptops, such as, LCD screens disposed in a top layer, keyboards below the LCD screen, drives, memory and modems in a middle layer, and the motherboard and battery at a bottom layer.

Due to the arrangement described above, in one embodiment, one may subject a variety of devices, from respective classes of devices, to imaging (e.g., CT scanning) to determine a range of feature vectors for respective classes. In this way, for example, an object that is screened at a security station may be partitioned (e.g., dividing image data of the object into layers), and respective partitions can be compared with pre-determined data for the object's corresponding class, to determine whether a potential threat item is concealed inside the object.

Figure 4:
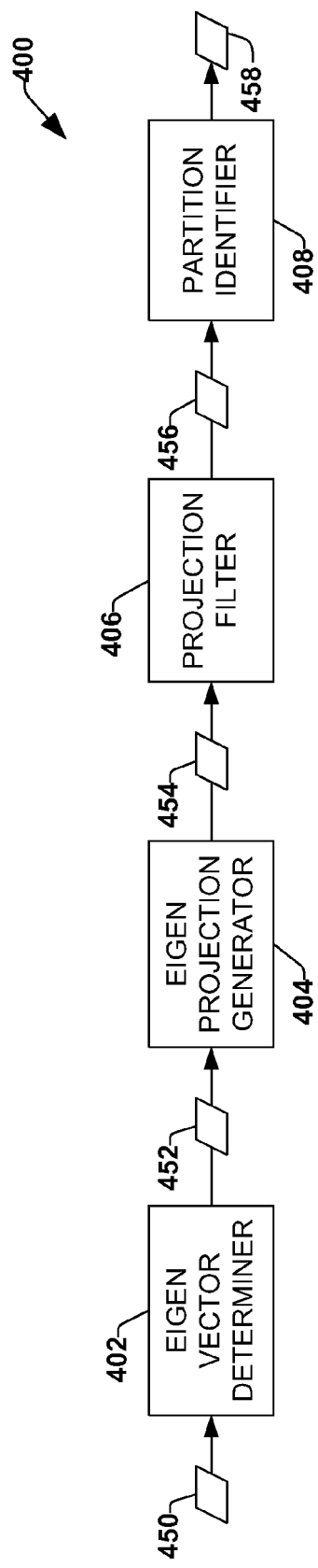
FIG. 4 is another component block diagram illustrating one embodiment of one or more components of an environment wherein potential threat object identification may be implemented as provided herein.

FIG. 4 is a component block diagram of one example embodiment 400 of an object partitioner (e.g., such as FIG. 1, 122), that can be configured to partition a segmented object into object partitions, based on the segmented object's class, using Eigen analysis. The example embodiment comprises an Eigen vector determiner 402, which can be configured to determine Eigen values and corresponding Eigen vectors of the segmented object 450. In one embodiment, a desired Eigen value may be determined by a class of objects to which the object in question belongs. In this embodiment, for example, partitioning of the object into layers may depend on a particular axis that the segmented object is oriented.

For example, as described above, a laptop computer may be comprised of several layers (e.g., three layers: screen and keyboard; components; motherboard and battery), from a perspective of top to bottom, along a thinnest dimension of the laptop (e.g., if laying flat on a conveyor, a Y axis, vertically). Therefore, in this example, a desired Eigen value may be a minimum value as this value can be associated with the Eigen vector that can be on the thinnest dimension of the laptop. It will be appreciated, that while objects subjected to screening may often be disposed flat upon a conveyor, some objects may not be oriented in such a manner and the X, Y, and Z axes (as described above) Eigen vectors can be used to overcome this limitation.

In the example embodiment 400, a one-dimensional Eigen projection generator 404 can be configured to generate a one-dimensional projection of the segmented object 454 along an Eigen vector associated with a desired Eigen value (e.g., minimum, medium, or maximum). As an example, if a desired Eigen value is a minimum Eigen value, such as when partitioning a laptop computer, the one-dimensional Eigen projection generator 404 can perform an Eigen projection onto an axis corresponding to the Eigen vector associated with the minimum Eigen value to generate one-dimensional projection data of the segmented object in the image.

One embodiment, performing a one-dimensional Eigen projection onto an axis corresponding to an Eigen vector can comprise performing an Eigen projection on to a plane with a normal of an Eigen vector of the segmented object in the image, which is disclosed in U.S. Pat. No. 6,345,113, Crawford et al., entitled Apparatus and Method for Processing Object Data in Computed Tomography Data Using Object Projections. As an example, in this embodiment, Eigen values and Eigen vectors of a covariance matrix can be determined from coordinates of image elements of the segmented object in the image, and Eigen values can be ranked according to their magnitudes, and an eigenvector corresponding to a smallest Eigen value, can be determined. Next, the image elements corresponding to the segmented object can be projected onto the plane perpendicular to an Eigen vector (i.e. Eigen vector corresponding to the minimum Eigen value), the projection referred to as a plane Eigen projection. In one embodiment, the projection is related to a count of a number of object voxels above or below a projection pixel in a direction of a selected eigenvector. In this embodiment, the pixel values in the Eigen projection are proportional to an object thickness along rays perpendicular to the projection plane. Further, in this embodiment, the projections can represent object shape, but not density. In an alternative embodiment, the projection pixels are computed using object voxel properties (i.e. densities). In this alternate embodiment, for respective projection pixels, a count can be computed using object voxels that are weighted according to their properties. In another embodiment, a one-dimensional Eigen projection corresponding to an Eigen vector associated with a desired Eigen value can be computed directly by summing the image elements on a plane that is perpendicular to an Eigen vector at respective coordinate steps without computing plane Eigen projections.

In the embodiment 400, one-dimensional projections for respective Eigen vectors are sent to a one-dimensional projection filter 406, which can be configured to smooth small variations and enhance peaks in the one-dimensional projection of the object 454. In one embodiment, a one-dimensional projection of the object 454 may comprise noise that can create many small variations in the line, for example. In this embodiment, in order to remove some of the small variations that may not impact the partitioning, and to enhance peaks in the projection data, a projection filter can be applied. It will be appreciated that there are many different filters that can be used to reduce signal noise and enhance peaks. The techniques and systems, described herein, are not limited to any particular filter, and those skilled in the art may devise filters that can reduce noise and enhance peaks in a one-dimensional projection of axes of the object 454.

In the embodiment 400, filtered one-dimensional projections for respective Eigen vectors 456 are sent to a partition identifier 408, which can be configured to identify object partitions 458 in an object corresponding to peak modes in a one-dimensional projection 456 of the segmented object. In one embodiment, peak modes in the one-dimensional projection 456 may represent partitions in an object, for example, layers in a class of objects (e.g., laptops). In this embodiment the partition identifier 408 can utilize the peak modes to partition the object into object partitions 458, for example, by separating one peak mode from neighboring peak modes. In this example, separation of the neighboring peak modes can be performed by identifying a valley point between two peaks or taking a middle point between two peak points.

Figure 5:
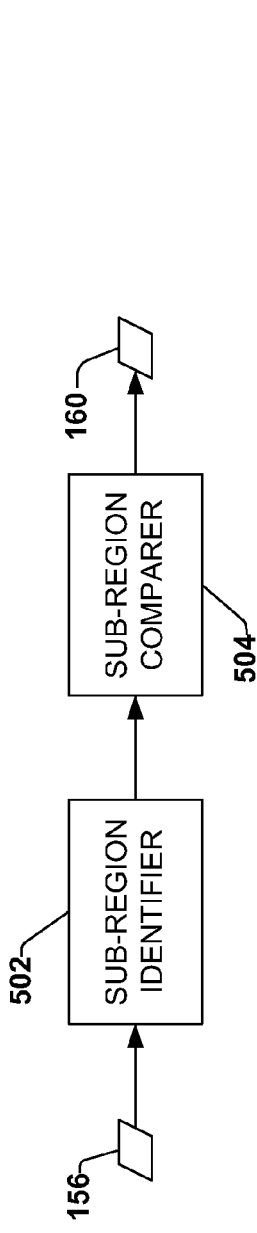
FIG. 5 is another component block diagram illustrating one embodiment of one or more components of an environment wherein potential threat object identification may be implemented as provided herein.

In another aspect, respective partitions of a segmented object, for example, may comprise components such as displays, drives, memory in portable electronic devices. As described above, a variety of devices may be pre-classified into classes, and feature vector data can be determined for respective classes. Further, in one embodiment, feature vector data can be determined for a variety of sub-regions (e.g., comprising device components) for respective classes of devices. FIG. 5 is a component block diagram of an example embodiment 500 of a sub-region extractor (e.g., as if FIG. 1, 128) that can be configured to identify sub-regions 160 in the identified object partitions 156.

In this example embodiment 500, a sub-region identifier 502 can be configured to identify one or more potential sub-regions 160 in an identified partition 156, from one or more classes of sub-regions. In one embodiment, for example, (e.g., as described in FIG. 2, 200) regions (e.g., voxels or pixels) in image data of an object partition can be selected based on a pre-determined range of properties (e.g., density and Z number), and combined to form one or more potential sub-regions (e.g., components in the partition of the object in the image comprising connected voxels). Further, in this example, a CCL algorithm can be used to extract such sub-regions with different sets of parameters for different classes of desired components for detection.

The example embodiment 500 further comprises a sub-region comparison component 504, which can be configured to compare the potential sub-region data with pre-determined sub-region data to identify whether the potential sub-region belongs to a class of known sub-regions. As an example, properties (e.g., density, mass, dimensions, etc.) can be determined for a potential sub-region, and the sub-region comparison component 504 can compare these properties to pre-determined properties of known sub-regions (e.g., battery in a laptop), for a particular class to which the object belongs (e.g., laptops). In this way, in this example, it may be determined if a potential sub-region is a known sub-region for that partition in a class for the segmented object.

A method may be devised for identifying one or more potentially threat-containing objects, from a class of objects, which has been subjected to imaging using an imaging apparatus. In one embodiment, the method may be used at a security station in an airport used for scanning passenger luggage, or for scanning devices either placed into security scanning bins or directly placed onto a conveyor. In this embodiment, for example, passenger luggage may be sent through a CT scanner, which can produce a stream of real-time images of the scanned luggage, or may send real-time image data to an automated threat detection system. In this example, electronic devices may be in luggage during scanning, or may be taken out from luggage for scanning. Therefore, in this example, the threat detection method may be used to identify potential threats inside objects that are inside passenger luggage, and/or for identifying potential threats inside objects scanned in bins or directly on conveyor.

Figure 6:
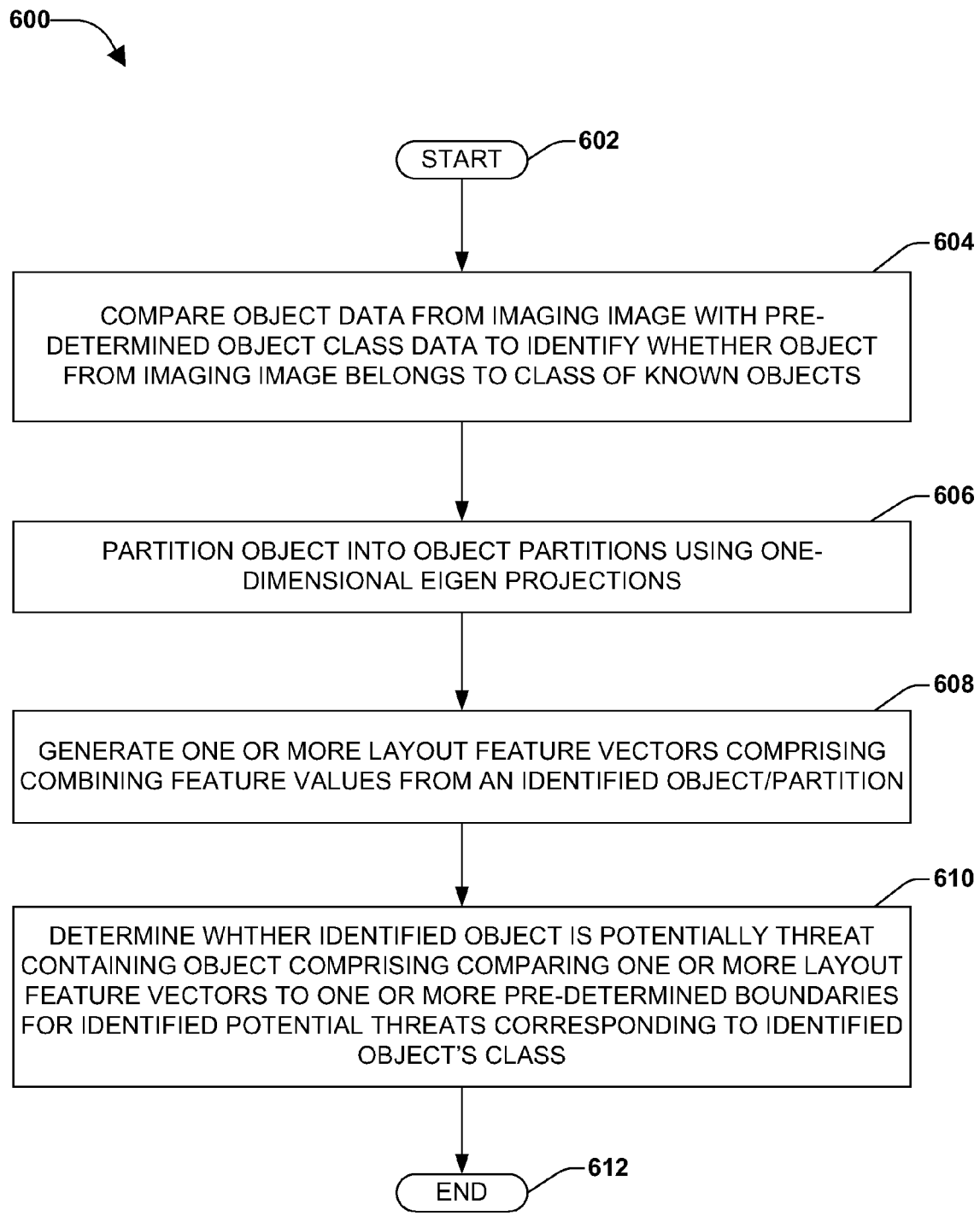
FIG. 6 is a flow chart diagram of an example method for identifying potential threat object.

FIG. 6 is a flow chart diagram of an example method 600 for identifying one or more potentially threat-containing objects when scanned in bins or directly, from a class of objects, which has been subjected to imaging using an imaging apparatus. The example method 600 begins at 602 and involves comparing the object data from the imaging image with pre-determined object class data to identify whether the object from the imaging image belongs to a class of known objects, at 604. A variety of objects can be sent through a scanning operation at a security station. In one embodiment, one can compare data (e.g., features such as density, density distribution, mass, dimensions, etc.) from the image for the object, with pre-determined data to identify to which class of objects the object in question may belong, if any.

As an example, a portable electronic device may be subjected to scanning at a security station of an airport, resulting in image data for the scanned device. In this example, one can compare the density, mass and dimensions of the object from the image data, with pre-determined data (e.g., from pre-scanning a variety of devices and developing derivative data for respective classes of objects) to determine that the device is a handheld video game.

Figure 11:
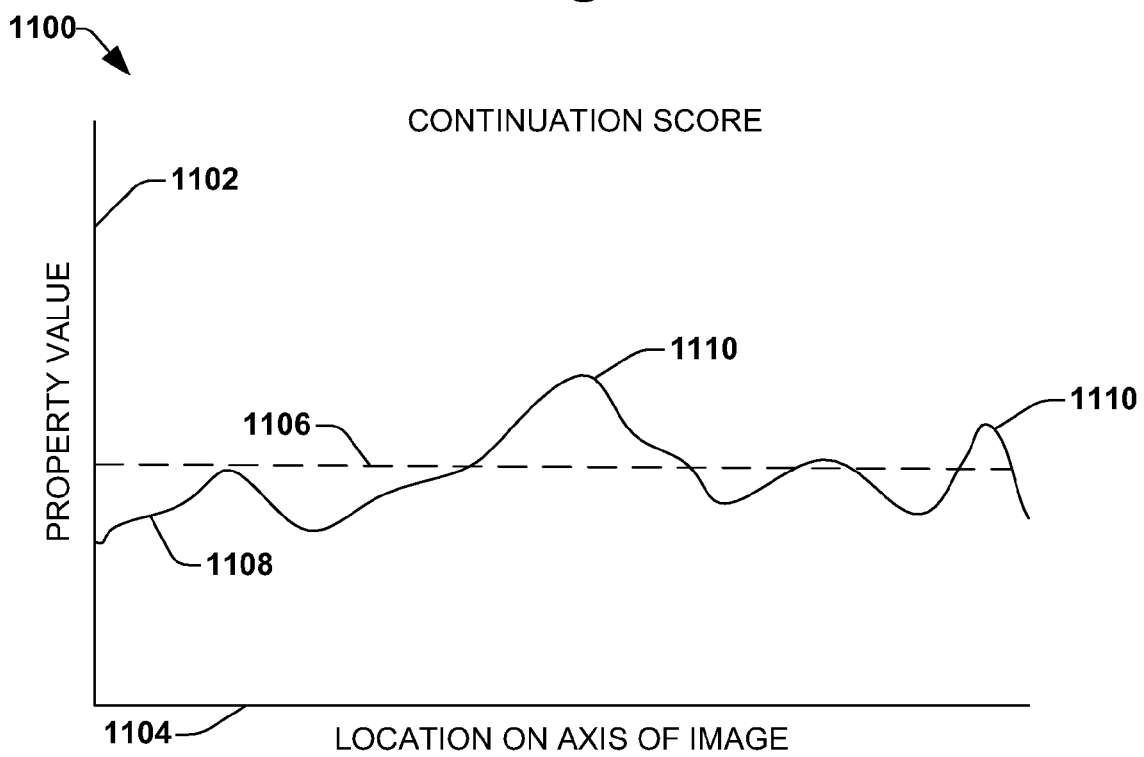
FIG. 11 is an illustration of an example embodiment of using an imaging image to detect a presence of a potential threat object.

FIG. 11 is graph 1100 illustrating a one-dimensional representation of an image on an axis. In another embodiment, comparing object data from an imaging image with pre-determined object class data 604 can comprise generating one dimensional representations 1108 of the imaging image on one or more axes, and comparing data points in a one dimensional representation 1108 with a pre-determined threshold 1106. In this embodiment, comparing object data from an imaging image with pre-determined object class data 604 can further comprise generating a continuation score corresponding to a desired number of consecutive data points 1110 greater than the threshold 1106 for a desired axis, and comparing continuation scores with one or more pre-determined scores for respective classes to determine whether an object corresponds to a class of objects. Further, in another embodiment, object dimensions along desired axes can be obtained by computing the bounding box, as described above. In this embodiment, one can compare object data with one or more pre-determined dimensions for respective classes to determine whether an object corresponds to a class of objects.

As an example, given X, Y, and Z axis (e.g., comprising a horizontal, vertical and conveyor direction respectively) image data for an identified object, a respective axis can be represented as a one-dimensional line 1108 on a graph. In this example, the horizontal axis of the graph 1104 can represent a point on the axis (e.g., X, Y, or Z); while the vertical axis of the graph 1102 can represent some property value (e.g., density integral over a plane perpendicular to a respective axis) of the object in question. As the property value for the object changes along the axis, the one-dimensional representation 1108 of the object along the axis can change, for example. Consecutive data points 1110 above the pre-determined threshold 1106 for a class of objects can be determined and, in one embodiment, the largest consecutive number of data points can be compared with information for the class to determine whether the object in question belongs to that particular class of objects (e.g., along with using other information relative with the object, such as density, mass, and dimensions).

At 606, in the example method 600, a segmented object can be partitioned into object partitions using one-dimensional Eigen projections with respect to an axis corresponding to, for example, the thinnest dimension of the segmented object. In one embodiment, the class to which the object in question belongs can be used to determine how to partition the segmented object. For example, a laptop computer may be partitioned into layers across its thinnest dimension (e.g., its height). In one example, feature vectors from object partitions may be used to compare with pre-determined thresholds to determine whether an object is potentially concealing a threat item.

Figure 8:
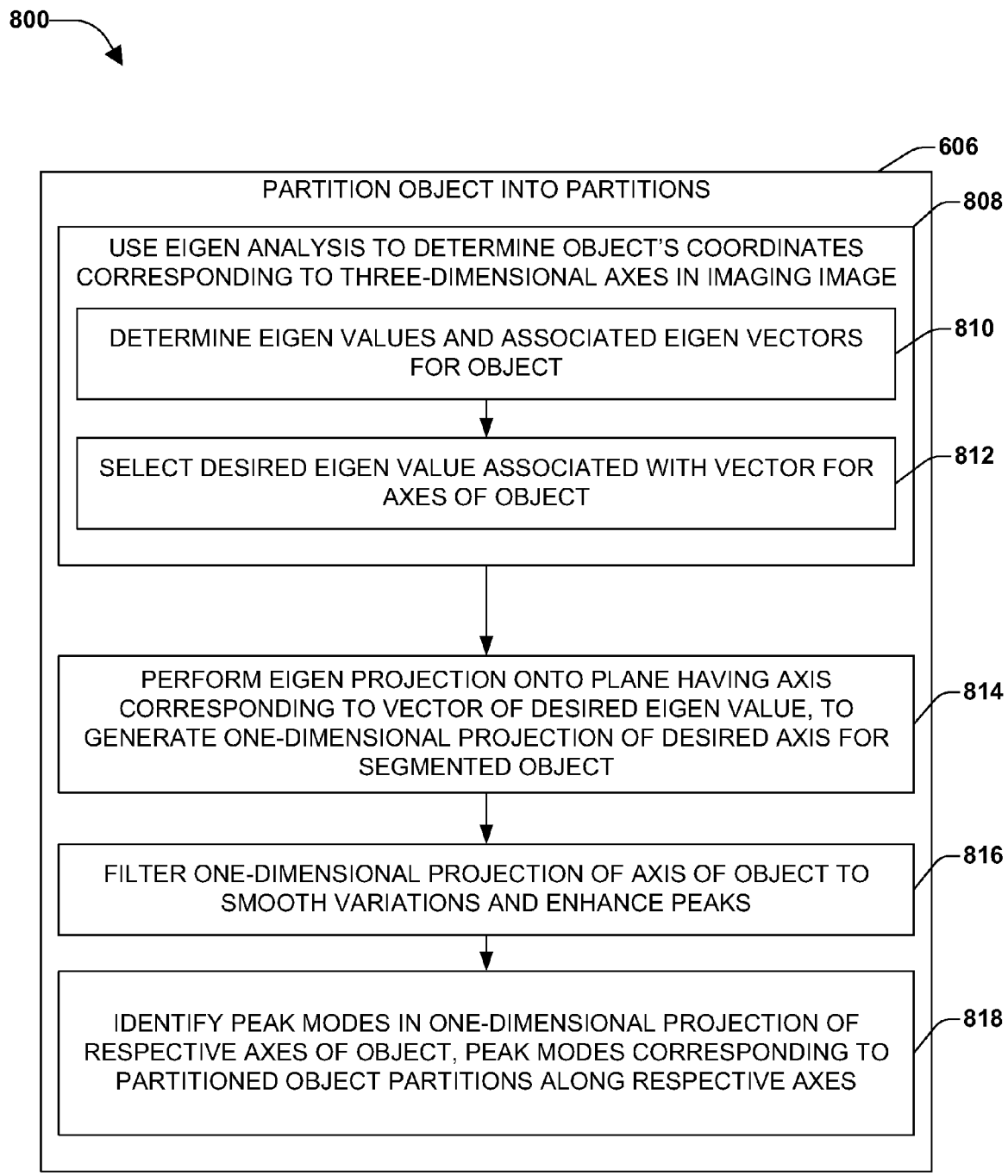
FIG. 8 is a flow chart diagram of another embodiment of an example method for identifying potential threat object.

FIG. 8 is a flow chart diagram of one example embodiment 800 of partitioning a segmented object into object partitions (as in FIG. 6, at 606). In this embodiment 800, at 808, one can use Eigen analysis to determine an object's coordinates, such as with respect to three-dimensional axes of a segmented object. In this embodiment, Eigen analysis can be used to determine Eigen values and associated Eigen vectors (e.g., X', Y', and Z' axes of the object), at 810. In this way, in one embodiment, a desired Eigen vector can be selected that corresponds to a desired partitioning of the class of object to which the identified object belongs. As an example, one may wish to partition a laptop into layers across its height; therefore a vector associated with a minimum Eigen value can be selected, which corresponds to a smallest dimension of the laptop.

At 812, a desired (e.g., minimum) Eigen value corresponding to an associated vector is selected for respective axes of the segmented object. In this embodiment, as an example, an Eigen vector corresponding to a middle Eigen value can be set as an X' axis for the segmented object; an Eigen vector corresponding to a minimum Eigen value can be set as a Y' axis; and an Eigen vector corresponding to a maximum Eigen value can be set as a Z' axis. In another example, a width, height, and length of the segmented object can be determined along respective object X', Y', and Z' axes.

At 814, an Eigen projection is performed onto a plane having an axis corresponding to the vector of the desired Eigen value, to generate a one-dimensional projection of a desired axis for the segmented object. As an example, if a desired object axis is Y' axis, which corresponds to the thinnest dimension of the segmented object (e.g., a height of a laptop computer), a one dimensional projection of the object's Y' axis can be generated by interpolating and summing property values of image elements in the X'-Z' plane for steps along the Y' axis. In one embodiment, as described above in FIG. 4, 400, an Eigen projection can be performed as disclosed in U.S. Pat. No. 6,345,113, Crawford et al., entitled Apparatus and Method for Processing Object Data in Computed Tomography Data Using Object Projections.

At 816, in the exemplary method 800, a one-dimensional projection of an object axis of the segmented object is filtered to smooth variations and enhance peaks. In one embodiment, in order to remove noise variations in the projection, and to enhance peaks, a projection filter can be applied. For example, a signal to noise ratio low-pass filter may be used that can reduce noise and increase peaks in a signal, such as a one-dimensional projection of an object axis.

At, 818, partitioning a segmented object can comprise identifying peak modes in the one-dimensional projection of respective object axes of the segmented object, where a peak mode corresponds to an object partition along the respective object axes. In one embodiment, the peak modes can be used to partition the segmented object into object partitions, for example, by separating one peak mode from neighboring peak modes. In this example, separation of the neighboring peak modes can be performed by identifying a valley point between two peaks or taking a middle point between two peak points.

Turning back to FIG. 6, at 608 in the example method 600, one or more layout feature vectors are generated, which can comprise combining feature values from at least one of a segmented object and its partitions. In one embodiment, feature values of the segmented object can be combined to generate a layout feature vector for the segmented object. In another embodiment, feature values of the partitions of the segmented object can be combined to generate a layout feature vector for the segmented object. In another embodiment, feature values of the segmented object and feature values of the partitions of the segmented object can be combined to generate a layout feature vector for the segmented object.

In one embodiment, a layout feature vector of an object can comprise properties of a segmented object, presence and/or absence of respective object partitions, presence or absence of sub-regions and properties of presented object partitions and sub-regions. In another embodiment, properties of a segmented object or an object partition can comprise mean, standard deviation, skew, kurtosis of density, mass, mean, standard deviation, skew, kurtosis of the atomic number, and dimensions. Further, in this embodiment, the properties can comprise both measurements before dilation and after dilation of a segmented object or an object partition. Additionally, in this embodiment, the properties can comprise properties of portions of a segmented object or an object partition such as dilated image elements.

In another embodiment, a layout feature vector of a segmented object can comprise properties of peak modes of one-dimensional projections of the segmented object, such as peak height, peak width, and area under the peak mode for each peak mode (e.g., comprising a number of voxels or pixels in a range of densities or intensities).

Figure 10:
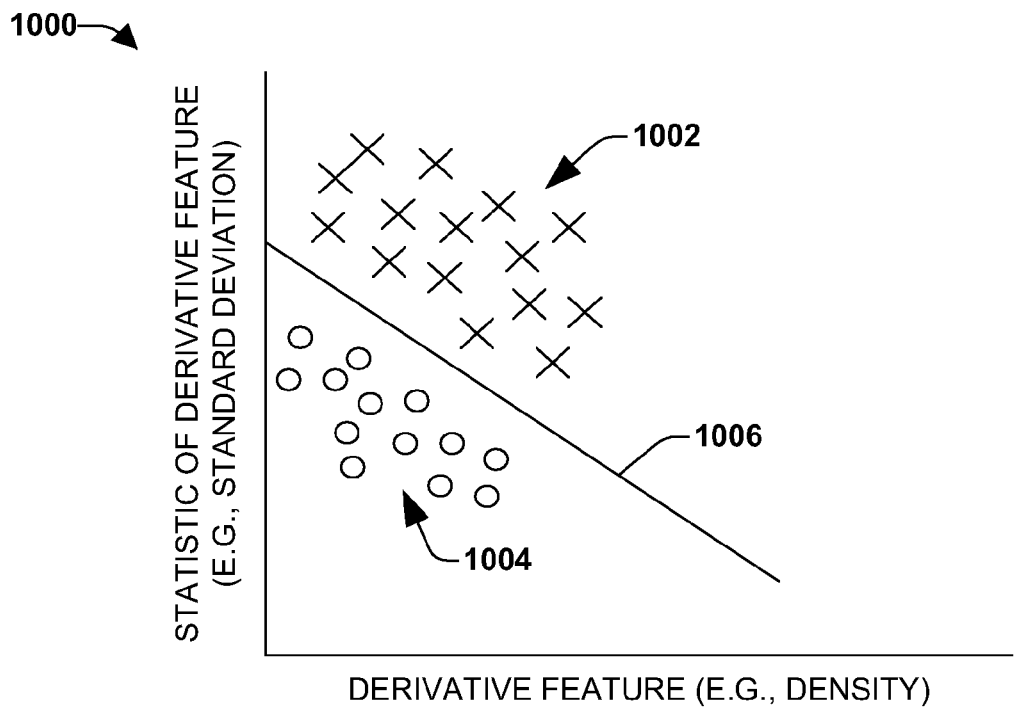
FIG. 10 is an example graph illustrating a discriminating boundary of pre-determined objects.

At 610, whether the segmented object is a potentially threat-containing object can be determined, which can comprise comparing the one or more layout feature vectors to one or more pre-determined boundaries for identified potential threats corresponding to a desired object's class. FIG. 10 is a graph 1000 illustrating an example of pre-determining a boundary. In one embodiment, determining a presence of a potential threat in a segmented object 610 can comprise generating a discriminating boundary 1006 for a class of objects to which a segmented object belongs.

In this embodiment, the generating a discriminating boundary can comprise analyzing layout feature vectors of objects containing potential threat items 1002, and layout feature vectors of objects not containing potential threat items 1004. In this embodiment, for example, a discriminating boundary can be obtained by using different classification training methods, such as linear discrimination method, principal component analysis, support vector machine, boost-ada training method, and manual partition of the hyper-dimensional layout feature vector space.

In this way, in this embodiment, one can compare one or more layout feature vectors for the segmented object with the pre-determined discriminating boundary 1006, to determine whether the segmented object is a potential threat-containing object. For example, if a layout feature vector falls on a side of the discriminating boundary 1006 that corresponds to potential threat-containing items, the object can be determined to be a potential threat-containing object and may require operators to further determine by other means, such as trace detection or hand search, if such an object contains a potential threat or not.

In another aspect, objects may not always be removed from a container (e.g., a portable electronic device in a passenger's luggage) prior to screening. In this aspect, for example, one may wish to identify the object in the container prior to determining whether the object is a potentially threat-containing object. For example, luggage is often screened at security checkpoints at airports. In this example, certain portable electronic devices are often found in luggage, such as laptop computers in carry-on luggage, or these devices can be removed from the luggage and placed in security screening bins.

Figure 7:
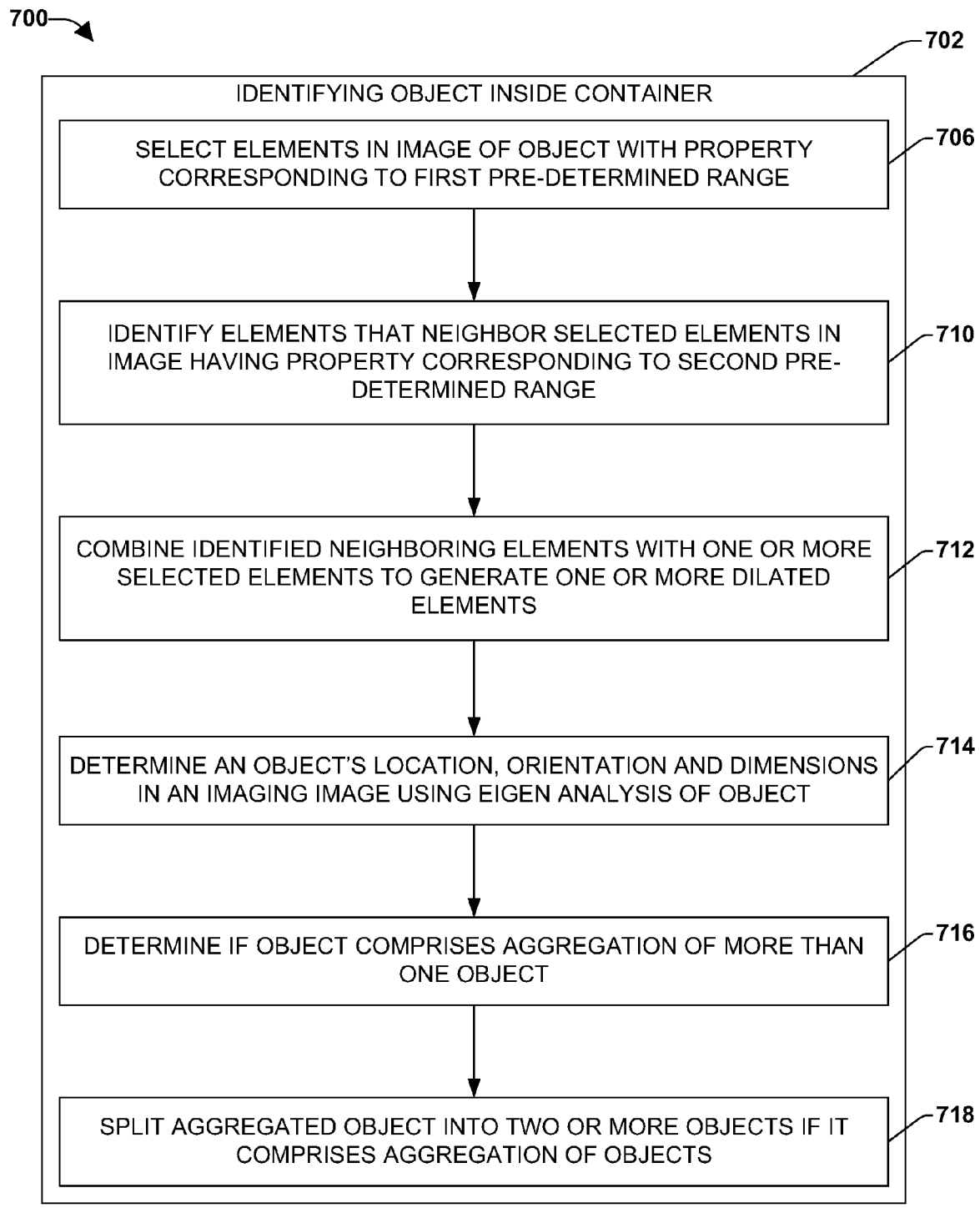
FIG. 7 is a flow chart diagram of one embodiment of an example method for identifying potential threat object.

FIG. 7 is a flow chart diagram 700 illustrating an example embodiment of identifying an object inside a container 702. At 706, one can select image elements in the image of the object with one or more property values corresponding to a first pre-determined range. As an example, voxels having a density within a range of densities for portable electronic devices can be selected.

At 710, image elements can be identified that neighbor the respective selected image elements in the image that have one or more property values corresponding to a second pre-determined range. For example, the selected voxels can be dilated by selecting voxels neighboring the respective selected voxels that fall within a second density range of portable electronic devices. At 712, the identified neighboring image elements can be combined with the one or more respective selected image elements to generate one or more dilated region combinations. For example, the dilated voxels can be combined with the previously selected voxels to form a group of candidate voxels for segmentation of one or more objects in the image. A CCL algorithm, for example, can be used to segment objects from the combination of the selected voxels and the dilated voxels.

At 714, in this embodiment, an object's location, orientation, and dimensions can be determined in the image using Eigen analysis of a segmented object. Further, at 716, it can be determined if the segmented object comprises an aggregation of two or more objects; and, at 718, those object identified as aggregated can be split into two or more objects.

Figure 9:
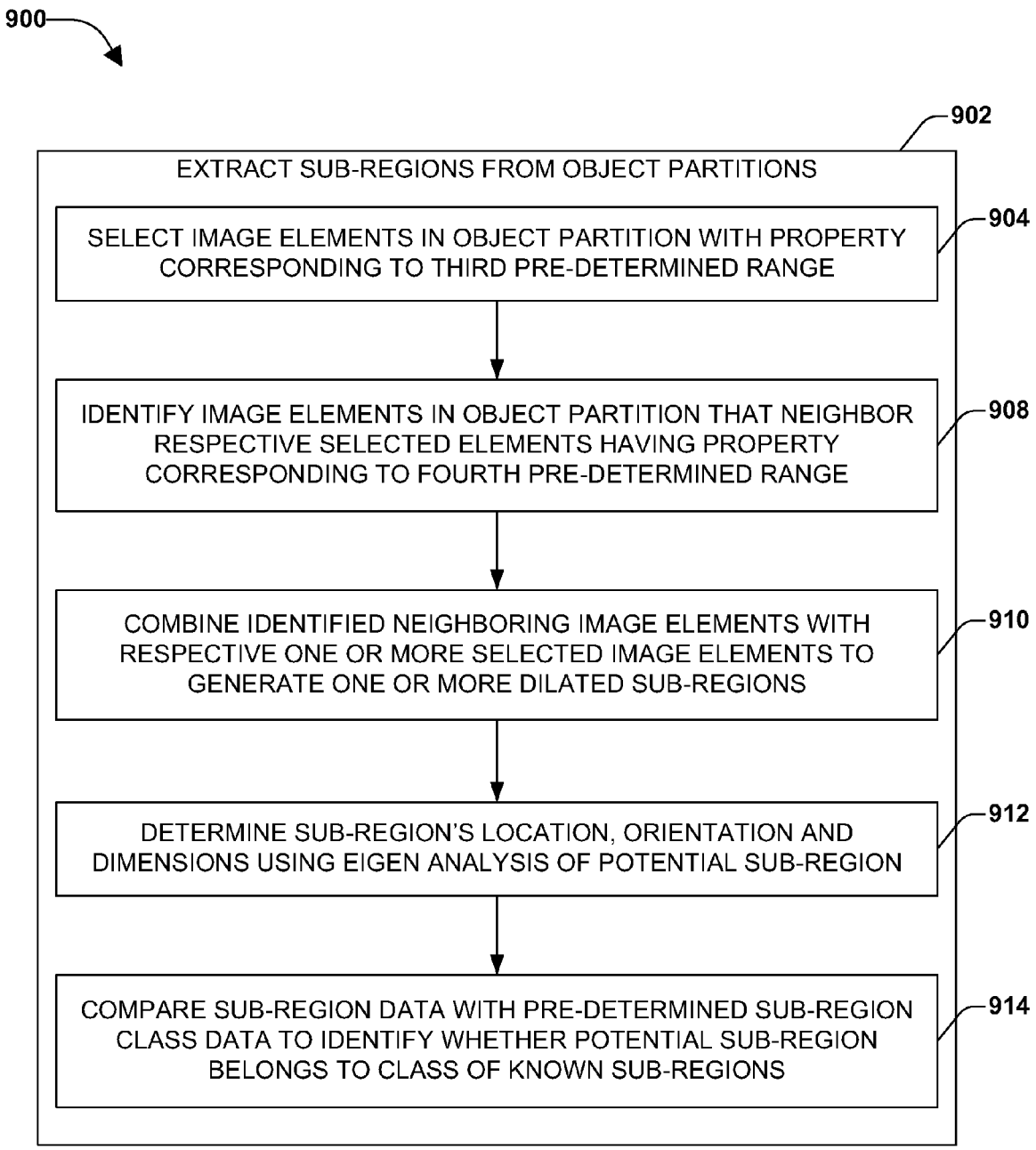
FIG. 9 is a flow chart diagram of another embodiment of an example method for identifying potential threat object.

In another aspect, object partitions (as described in FIG. 8, 800) may be divided into sub-regions. For example, a portable electronic device can comprise several components (e.g., a laptop can have a battery, LCD screen, hard drive, etc.), which one may utilize to develop features for the segmented object. FIG. 9 is a flow chart diagram 900 illustrating an example of extracting sub-regions from object partitions 902. At 904, image elements in an object partition are select that have property values corresponding to a third pre-determined range. Much like as is described above (in FIG. 7, 700), for example, voxels (for a three-dimensional image) or pixels (for a two-dimensional image) can be selected based on an image element value falling within a pre-determined range. At 908, neighboring image elements to the selected image elements can be identified that meet a predetermined range; and, at 910, these neighboring image elements can be combined with the selected image elements to be segmented and grouped into sub-regions.

At 912, a sub-region's orientation and dimensions can be determined using Eigen analysis; and, at 914, the sub-region data can be compared with pre-determined sub-region class data to identify whether the sub-region belongs to a class of known sub-regions. Further, in one embodiment, feature vectors for identified sub-regions can be determined, for example, and used to generate a layout feature vector for the segmented object.

Figure 12:
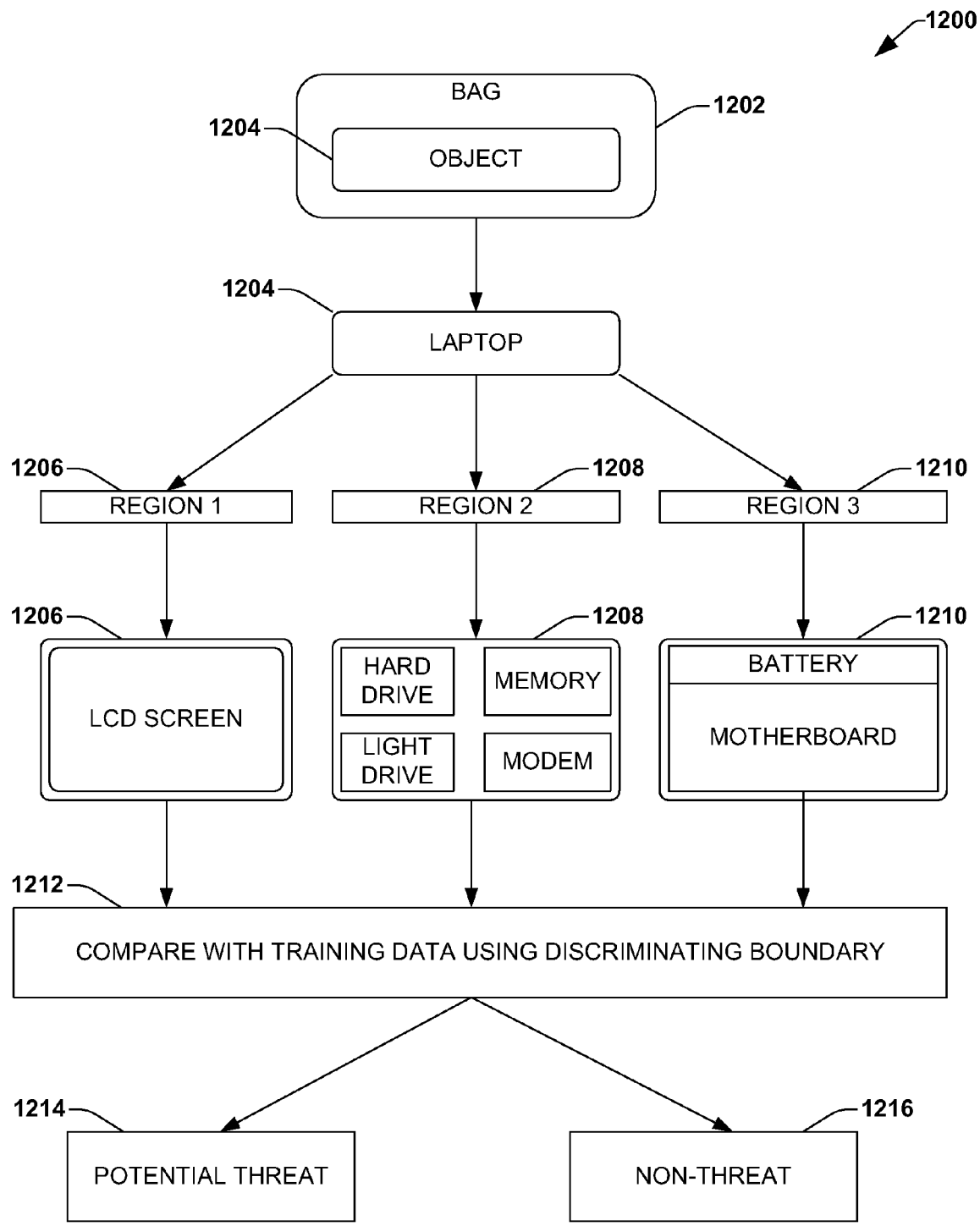
FIG. 12 is an illustration of an example threat detection process wherein one or more of the techniques and/or systems described herein may be implemented.

FIG. 12 is an illustration of an example process 1200 for determining whether an object is a potential threat-containing object, using the techniques described herein. A bag 1202 contains unknown objects, for example, and is subjected to a CT scanner at an airport security station. One of the objects 1204 is segmented to be a candidate of a laptop computer (e.g., as in FIG. 7, 702), and partitioned into three layers 1206, 1208, and 1210 (e.g., as in FIG. 8, 606). The partitions are section into sub regions (e.g., as seen in FIG. 9, 902), region one 1206 may comprise an LCD screen, region two 1208 a series of components, and region three 1210 a battery and motherboard. At 1212, a layout feature vector, for example, from the segmented object, partitions, and sub-regions, are compared with a discriminating boundary generated by training data (e.g., subjecting a variety of laptops to screening using a same-type CT scanner). The comparison of the layout feature vectors to the discriminating boundary can facilitate in determining whether the segmented object is a laptop computer containing a potential threat 1214, for example, if the layout feature vector for the segmented object is on a side of the discriminating boundary that corresponds to training data from laptops containing threats. Otherwise, the laptop can be determined to be a non-threat 1216.

Figure 13:
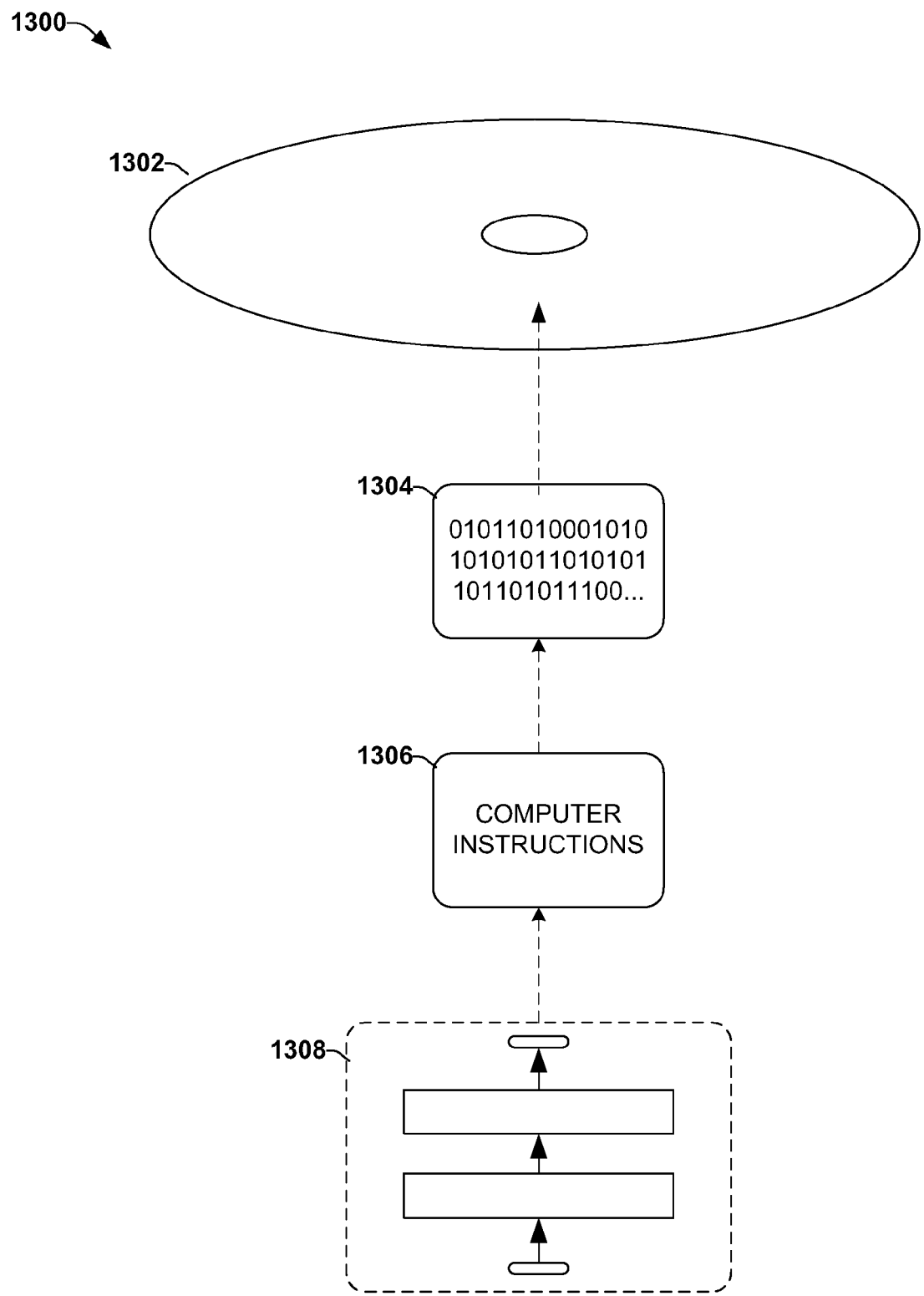
FIG. 13 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 13, wherein the implementation 1300 comprises a computer-readable medium 1302 (e.g., a CD-R, DVD-R, or a platter of a hard disk drive), on which is encoded computer-readable data 1304. This computer-readable data 1304 in turn comprises a set of computer instructions 1306 configured to operate according to one or more of the principles set forth herein. In one such embodiment 1300, the processor-executable instructions 1306 may be configured to perform a method, such as the example method 600 of FIG. 6, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for identifying a potentially threat-containing object that has been subjected to imaging using an imaging apparatus, comprising:
   a processor; and
   memory comprising instructions that when executed via the processor implement at least some of:

an object partitioner configured to partition an image of an object into two or more object partitions by:
  projecting the image along a first Eigen vector, associated with a first Eigen value, to generate an Eigen projection;
  projecting the Eigen projection along a second Eigen vector, associated with a second Eigen value, to generate a one-dimensional projection, the second Eigen value less than the first Eigen value; and
  identifying peak modes in the one-dimensional projection, a first peak mode corresponding to a first object partition of the two or more object partitions and a second peak mode corresponding to a second object partition of the two or more object partitions;
a layout vector generator configured to generate a layout feature vector corresponding to the first object partition based at least in part upon one or more features associated with the first object partition; and
a threat determiner configured to compare the layout feature vector to one or more predetermined boundaries to determine whether the object is a potentially threat-containing object.

2. The system of claim 1, comprising an object segmentor configured to segment the image of the object from an image of a container comprising the object.

3. The system of claim 2, the object segmentor comprising:
a one dimensional image data processor configured to generate a one dimensional representation of an axis of the image of the container;
an axes data processor configured to compare data points in the one dimensional representation of the axis with a predetermined threshold;
a continuation score generator configured to generate a continuation score corresponding to a number of consecutive data points greater than the predetermined threshold; and
a continuation score comparison component configured to compare the continuation score with a predetermined score to determine whether the number of consecutive data points represent an object of a class of objects where partitioning is desirable.

4. The system of claim 1, the object partitioner comprising an Eigen vector determiner configured to determine Eigen vectors for the object including the first Eigen vector and the second Eigen vector.

5. The system of claim 1, comprising a sub-region extractor configured to identify a sub-region in the first object partition, the sub-region extractor comprising:
a sub-region identifier configured to identify a potential sub-region in the first object partition; and
a sub-region comparison component configured to compare the potential sub-region with predetermined sub-region data to identify whether the potential sub-region belongs to a class of known sub-regions.

6. The system of claim 1, the threat determiner configured to compare the layout feature vector to a discriminating boundary corresponding to a class of objects to determine whether the object is associated with the class of objects.

7. A method for identifying a potentially threat-containing object that has been subjected to imaging using an imaging apparatus, comprising:
partitioning an image of an object into two or more object partitions, comprising:
  projecting the image along a first Eigen vector, associated with a first Eigen value, to generate an Eigen projection;
  projecting the Eigen projection along a second Eigen vector, associated with a second Eigen value, to generate a one-dimensional projection, the second Eigen value less than the first Eigen value; and
  identifying peak modes in the one-dimensional projection, a first peak mode corresponding to a first object partition of the two or more object partitions and a second peak mode corresponding to a second object partition of the two or more object partitions;
generating a layout feature vector corresponding to the first object partition based at least in part upon one or more features associated with the first object partition; and
determining whether the object is a potentially threat-containing object comprising comparing the layout feature vector to one or more predetermined boundaries for potential threat objects.

8. The method of claim 7, comprising:
segmenting the image of the object from an image of a container comprising the object.

9. The method of claim 7, comprising:
determining whether the object belongs to a class of known objects; and
performing the acts of partitioning, generating, and determining whether the object is a potentially threat-containing object merely when the object belongs to the class of known objects.

10. The method of claim 9, the determining whether the object belongs to a class of known objects comprising:
performing an Eigen analysis on the image of the object to determine Eigen vectors for the object including the first Eigen vector and the second Eigen vector; and
comparing features of the object to features of one or more known objects comprised in the class of known objects based at least in part upon the Eigen vectors to determine whether the object belongs to the class of known objects.

11. The method of claim 7, comprising identifying the object, comprising:
generating a one dimensional representation of an axis of the image of the object; and
comparing data points in the one dimensional representation of the axis with a predetermined threshold.

12. The method of claim 11, the identifying comprising:
generating a continuation score corresponding to a number of consecutive data points greater than a predetermined threshold; and
comparing the continuation score with a predetermined score to determine whether the object belongs to a class of known objects, wherein
the acts of partitioning, generating, and determining whether the object is a potentially threat-containing object are not performed when the object does not belong to the known class of objects.

13. The method of claim 7, the partitioning comprising:
performing an Eigen analysis on the image of the object to determine Eigen vectors for the object including the first Eigen vector and the second Eigen vector.

14. A non-transitory computer readable medium comprising processor-executable instructions that when executed perform a method for identifying a potentially threat-containing object that has been subjected to imaging using an imaging apparatus, the method comprising:
partitioning an image of an object into two or more object partitions, comprising:
  projecting the image along a first Eigen vector, associated with a first Eigen value, to generate an Eigen projection;

projecting the Eigen projection along a second Eigen vector, associated with a second Eigen value, to generate a one-dimensional projection, the second Eigen value less than the first Eigen value; and identifying peak modes in the one-dimensional projection, a first peak mode corresponding to a first object partition of the two or more object partitions and a second peak mode corresponding to a second object partition of the two or more object partitions;

generating a layout feature vector corresponding to the first object partition based at least in part upon one or more features associated with the first object partition; and determining whether the object is a potentially threat-containing object comprising comparing the layout feature vector to one or more predetermined boundaries for potential threat objects.

15. The non-transitory computer readable medium of claim 14, the method comprising:

segmenting the image of the object from an image of a container comprising the object.

16. The non-transitory computer readable medium of claim 14, the method comprising:

determining whether the object belongs to a class of known objects; and performing the acts of partitioning, generating, and determining whether the object is a potentially threat-containing object merely when the object belongs to the class of known objects.

17. The non-transitory computer readable medium of claim 16, the determining whether the object belongs to a class of known objects comprising:

performing an Eigen analysis on the image of the object to determine Eigen vectors for the object including the first Eigen vector and the second Eigen vector; and comparing features of the object to features of one or more known objects comprised in the class of known objects based at least in part upon the Eigen vectors to determine whether the object belongs to the class of known objects.

18. The non-transitory computer readable medium of claim 14, the method comprising:

identifying a potential sub-region in the first object partition; and comparing the potential sub-region with predetermined sub-region data to identify whether the potential sub-region belongs to a class of known sub-regions.

19. The non-transitory computer readable medium of claim 14, the object comprising a laptop.

20. The non-transitory computer readable medium of claim 14, wherein the first object partition corresponds to a first distinct layer of the object and the second object partition corresponds to a second distinct layer of the object, the first distinct layer different than the second distinct layer.

* * * * *